(12) United States Patent
Huang

(10) Patent No.: US 9,497,838 B2
(45) Date of Patent: Nov. 15, 2016

(54) ENERGY STORAGE DEVICE

(71) Applicant: Tai-Yin Huang, Macungie, PA (US)

(72) Inventor: Tai-Yin Huang, Macungie, PA (US)

(73) Assignee: Tai-Yin Huang, Macungie, PA (US)

( * ) Notice: Subject to any disclaimer, the term of this patent is extended or adjusted under 35 U.S.C. 154(b) by 235 days.

(21) Appl. No.: 14/460,698

(22) Filed: Aug. 15, 2014

(65) Prior Publication Data

US 2015/0195895 A1 Jul. 9, 2015

(30) Foreign Application Priority Data

Jan. 3, 2014 (TW) .............................. 103200136 U

(51) Int. Cl.
*H02J 7/00* (2006.01)
*H05F 7/00* (2006.01)
*H02J 7/34* (2006.01)

(52) U.S. Cl.
CPC .............. *H05F 7/00* (2013.01); *H02J 7/0029* (2013.01); *H02J 7/345* (2013.01); *H02J 2007/0039* (2013.01)

(58) Field of Classification Search
CPC ........... Y02T 10/7005; Y02T 10/7044; Y02T 10/7066; Y02T 10/7011; Y02T 10/7061; Y02T 90/127; B60L 11/1868; B60L 11/182; B60L 11/1866; H02J 5/005; H02J 7/025; H02J 7/1423; H02J 17/00; H02J 7/0003
USPC .................................................. 320/106–114
See application file for complete search history.

(56) References Cited

U.S. PATENT DOCUMENTS

2008/0074083 A1* 3/2008 Yarger ................ H01M 6/5033
320/137
2008/0238356 A1* 10/2008 Batson .................. H02J 7/0045
320/103

* cited by examiner

*Primary Examiner* — Binh Tat
(74) *Attorney, Agent, or Firm* — Li & Cai Intellectual Property (USA) office

(57) ABSTRACT

An energy storage device configured for a vehicle or a building is provided. The energy storage device includes a receiving element, a conduction element, a limiting current element, a voltage dividing element, and a storage element. The receiving element is configured for receiving a lightning's electrical power in an environment. The conduction element is coupled to the receiving element and is configured for conducting a first path or a second path in accordance with an electrical property of the lightning's electrical power. The voltage dividing element is coupled to the limiting current element and is configured for dividing a voltage of the lightning's electrical power. The storage element is coupled to the voltage dividing element and is configured for storing the lightning's electrical power.

9 Claims, 4 Drawing Sheets

ENERGY STORAGE DEVICE

BACKGROUND

1. Technical Field

The present invention relates to an energy storage device, in particular, to an energy storage device configured for a vehicle or a building.

2. Description of Related Art

Nowadays, due to the international energy crisis, every country actively seeks sustainable, renewable, and clean alternative energy sources, such as wind power, tidal power, solar power, or other green power taken from the environment. Green power does not produce an excessive amount of carbon dioxide and other greenhouse gases, which can helpfully protect the environment.

Furthermore, because of the friction between the earth's rotation and the atmosphere and electric charge existing in air, clouds, and the surface of the earth, lightning power will be produced regularly in the environment. Lightning power also belongs to green power. However, lightning power is power having instantaneous high-voltage and instantaneous high-current, such as power having the highest voltage to be a million volts and thirty thousand amps in several tens of microseconds. Therefore, people use a lightning rod to guide the lightning's electrical power to the ground, so as to avoid lightning's electrical power damaging people or electrical equipment.

SUMMARY

Accordingly, an objective of the instant disclosure is to provide an energy storage device for receiving lightning's electrical power and then storing the lightning's electrical power, which can achieve environmental protection and provide the power to the electrical equipment simultaneously.

An exemplary embodiment of the instant disclosure provides an energy storage device configured for a vehicle or a building. The energy storage device includes a receiving element, a conduction element, a limiting current element, a voltage dividing element, and a storage element. The receiving element is configured for receiving lightning's electrical power from an environment. The conduction element is coupled to the receiving element and configured for conducting a first path or a second path in accordance with an electrical property of the lightning's electrical power. The limiting current element is coupled to the conduction element and configured for limiting a current of the lightning's electrical power. The voltage dividing element is coupled to the limiting current element and configured for dividing a voltage of the lightning's electrical power. The storage element is coupled to the voltage dividing element and configured for storing the lightning's electrical power.

To sum up, the energy storage device is used to store the lightning's electrical power to the storage element. The current of the lightning's electrical power is limited by the limiting current element to generate the limited current of the lightning's electrical power to the voltage dividing element and the storage element. The voltage of the lightning's electrical power is divided by the voltage dividing element to generate a voltage suitable for the storage element to charge the storage element. Accordingly, the energy storage device can achieve the environmental protection and provide power to the electrical equipment of a vehicle or building.

In order to further understand the techniques, means and effects of the present invention, the following detailed descriptions and appended drawings are hereby referred to, such that, and through which, the purposes, features and aspects of the present disclosure can be thoroughly and concretely appreciated; however, the appended drawings are merely provided for reference and illustration, without any intention to be used for limiting the present invention.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain the principles of the present invention.

DESCRIPTION OF THE EXEMPLARY EMBODIMENTS

Figure 1A:
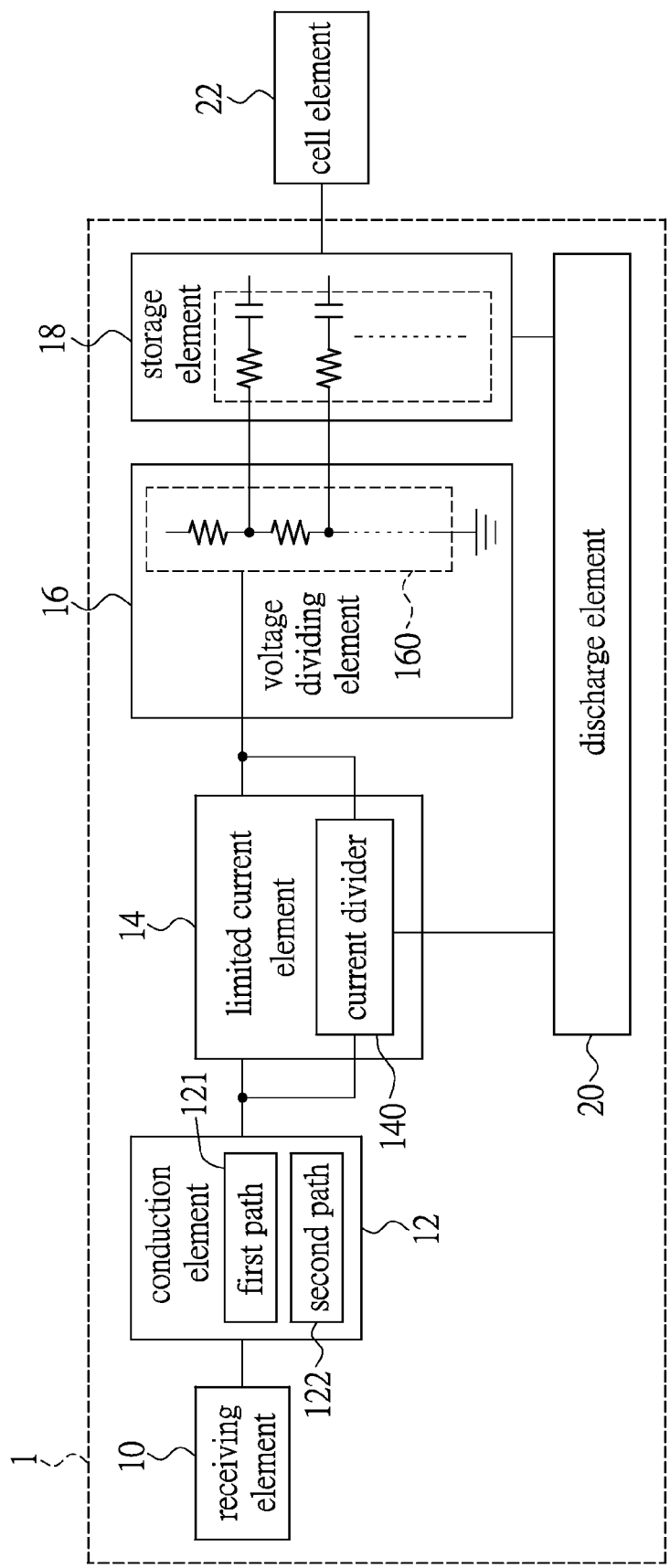
FIG. 1A is a block diagram of an energy storage device according to an exemplary embodiment of the instant disclosure.

Reference will now be made in detail to the exemplary embodiments of the present disclosure, examples of which are illustrated in the accompanying drawings. Wherever possible, the same reference numbers are used in the drawings and the description to refer to the same or like parts.

Figure 1B:
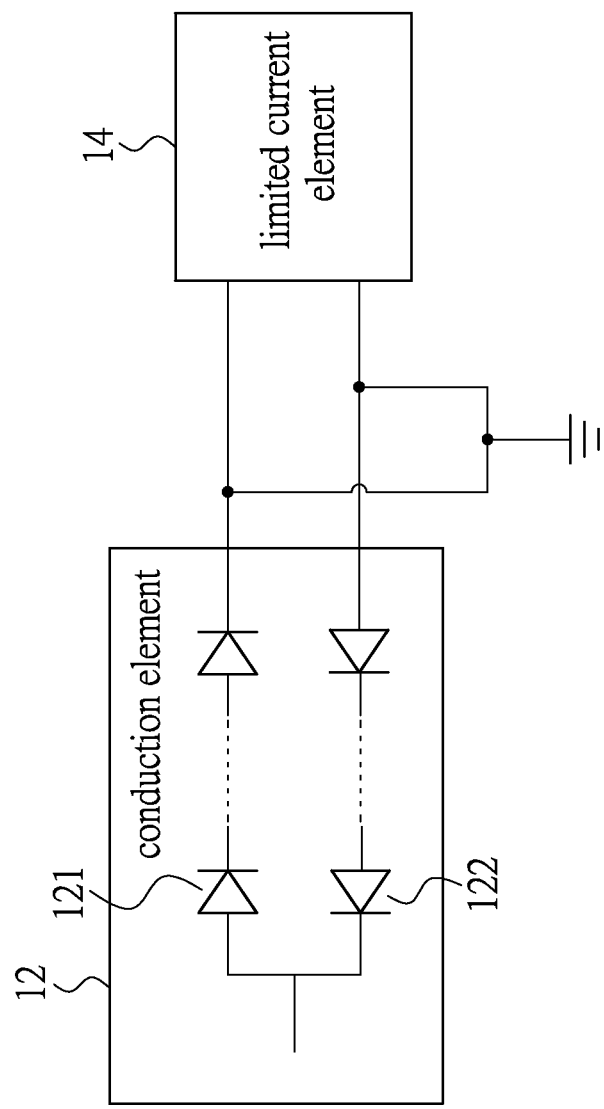
FIG. 1B is a partial block diagram of an energy storage device according to FIG. 1A.

Please refer to FIG. 1A and FIG. 1B, FIG. 1A is a block diagram of an energy storage device according to an exemplary embodiment of the instant disclosure. FIG. 1B is a partial block diagram of an energy storage device according to FIG. 1A. As shown in FIG. 1A and 1B, the energy storage device 1 includes a receiving element 10, a conduction element 12, a limiting current element 14, a voltage dividing element 16, and a storage element 18. In practice, the conduction element 12 is coupled between the receiving element 10 and the limiting current element 14. The voltage dividing element 16 is coupled between the limiting current element 14 and the storage element 18. The receiving element 10 of the energy storage device 1 receives lightning's electrical power in an environment and stores the lightning's electrical power to the storage element 18 of the energy storage device 1. The storage element 18 that has stored the lightning's electrical power can be coupled to a cell element 22, so that the cell element 22 can accordingly output power to electrical equipment of a vehicle or building. The instant embodiment does not limit the types and the purposes of the energy storage device 1.

It is worth to mention that, the energy storage device 1 can be configured within a system module of the electrical equipment and the cell element 22 can be configured without the system module of the electrical equipment. In other embodiments, the energy storage device 1 does not provide the power to the cell element 22 or the energy storage device 1 does not have the cell element 22. For example, the energy storage device 1 directly provides the power to the back-end electrical equipment. The instant embodiment does not limit the types of the energy storage device 1.

The receiving element 10 is configured for receiving the lightning's electrical power in the environment. The receiving element 10, for example, is an active lightning rod or a passive lightning rod, wherein the active lightning rod attracts the lightning by actively discharging, but the area of the active lightning rod is bigger than that of the trident-type lightning rod, Franklin lightning rod, or other passive lightning rods. The passive lightning rod, for example, can be a conventional lightning rod, which is configured at the top of the vehicle or the building or is configured at a place for easily receiving the lightning.

The conduction element 12 is coupled between the receiving element 10 and the limiting current element 14. The conduction element 12 is configured for conducting a first path 121 or a second path 122 in accordance with an electrical property of the lightning's electrical power. In practice, when the conduction element 12 determines that the lightning's electrical power is positive charge, the conduction element 12 conducts the first path 121. When the conduction element 12 determines that the lightning's electrical power is negative charge, the conduction element 12 conducts the second path 122. Accordingly, the positive charge or the negative charge can flow through the conduction element 12, wherein a first one-way conduction element is configured in the first path 121 and a second one-way conduction element is configured in the second path 122. An end of the first one-way conduction element is electrically connected to an end of the second one-way conduction element. The first one-way conduction element and the second one-way conduction element are configured reversely. Therefore, the positively charged current flows through the first one-way conduction element and the negatively charged electron current flows through the second one-way conduction element, so that the positive charge and the negative charge flow are divided.

More specifically, the first one-way conduction element, for example, has one or more serial diodes. The second one-way conduction element has one or more serial diodes. The instant disclosure is not limited thereto. Definition of the positive charge and the negative charge, the direction of the positive charge is the direction of the current and the direction of the negative charge is the direction of the electron current. When the lightning's electrical power, for example, is positive lightning or positive stroke, the positively charged current flows through the first one-way conduction element. In other words, the conduction element 12 conducts the first path 121 in accordance with the positively charged current of the lightning's electrical power, so that the positively charged current of the lightning's electrical power flows through the first path 121.

In addition, when the lightning's electrical power, for example, is negative lightning or a negative stroke, the negatively charged electron current flows through the second one-way conduction element. In other words, the conduction element 12 conducts the second path 122 in accordance with the negatively charged electron current of the lightning's electrical power, so that the negatively charged electron current of the lightning's electrical power flows through the second path 122.

Therefore, the current and the electron current generated by the lightning's electrical power respectively flow through the first path 121 and the second path 122 of the conduction element 12. For clarity, the following description further elaborates a current generated by the negative lightning. In practice, most lightning in nature is negative lightning and less is positive lightning. The instant embodiment does not limit the types of the conduction element 12 and the lightning's electrical power. Besides, the limiting current element 14, voltage dividing element 16, and the storage element 18 can be designed according to the electrical property of the current or the electron current to generate the suitable circuit.

It is worth to note that there is a circuit suitable for the electrical property of the current and the electron current simultaneously in the electronic circuitry. Please refer to FIG. 1B, the first one-way conduction element and the second one-way conduction element are respectively coupled to the limiting current element 14. A ground terminal is coupled between the first one-way conduction element and the limiting current element 14 and is coupled between the second one-way conduction element and the limiting current element 14. The ground terminal connects to ground. Accordingly, a loop is formed by the first one-way conduction element and the ground terminal, so that the current is outputted to the limiting current element 14 through the first path 121. Conversely, another loop is formed by the second one-way conduction element and the ground terminal, so that the electron current is outputted to the limiting current element 14 through the second path 122. Therefore, the limiting current element 14, voltage dividing element 16, and the storage element 18 can be designed by the above loops. The instant embodiment does not limit circuit types of the energy storage device 1. In the instant disclosure, the ground terminal, for example, is a discharge rod configured at the airplane to form a Faraday's cage. For example, when the airplane suffers from the lightning with positive charge, the Faraday's cage shelters parts of the large current of the lightning's electrical power and a partial current of the lightning's electrical power can be received from the receiving element of the housing of the airplane. Then the partial current of the lightning's electrical power is transmitted to the limiting current element 14 through the second path 122 of the conduction element 12.

The limiting current element 14 is coupled between the conduction element 12 and the voltage dividing element 16 for limiting the current of the lightning's electrical power. In practice, the limiting current element 14 includes a current divider 140 and has a preset current value. When the current of the lightning's electrical power is higher than the preset current value, the limiting current element 140 is conducted so that a current of the lightning's electrical power exceeding the preset current value is guided and discharged to the discharge element 20. When the current of the lightning's electrical power is equal to or less than the preset current value, the current of the lightning's electrical power is outputted to the voltage dividing element 16.

More specifically, the discharge element 20, for example, is a ground element or a discharger, such as discharge rods configured at two wings of an airplane, ground bars of a boat, ground lines of a car, ground copper bars of a building, etc. The instant embodiment does not limit the types of the discharge element 20.

For example, the preset current value of the limiting current element 14 is 1,000 amps. The average current of the lightning's electrical power is 30,000 amps. Thus the 29,000 amps current is guided and discharged to the discharge element 20 from the current divider 140, e.g., the 29,000 amps current is guided and discharged to the environment through the discharge rods configured at two wings of the airplane. The 1,000 amps current is guided and outputted to the voltage dividing element 16 from the limiting current element 14. Besides, the preset current value can be 10,000 amps, 30,000 amps, 50,000 amps, or other values. The instant embodiment does not limit the types of the preset current value.

Simply speaking, the limiting current element 14 is configured for limiting the current of the lightning's electrical power flowing through the limiting current element 14. A current of the lightning's electrical power exceeding the preset current value is guided and discharged to the discharge element 20 through the current divider 140. Thus the limiting current element 14 can protect the circuit or the electronic components of the back-end electrical equipment to prevent the current of the lightning's electrical power from damaging the circuit or the electronic components of the back-end electrical equipment.

The voltage dividing element 16 is coupled between the limiting current element 14 and the storage element 18 and is configured for dividing the voltage of the lightning's electrical power. In practice, the voltage dividing element 16 has a preset voltage value. When the voltage of the lightning's electrical power is higher than the preset voltage value, the voltage of the lightning's electrical power exceeding the preset voltage value is guided and discharged to the environment. Specifically, the voltage dividing element 16 has one or more voltage dividers 160. Thus the voltage dividing element 16 divides the high voltage of the lightning's electrical power to provide a voltage suitable for the storage element 18 to the storage element 18.

It is worth to note that a ground end of the voltage dividing element 16 is substantially equal to the discharge element 20. Therefore, after dividing the limited current of the lightning's electrical power through the voltage dividing element 16, the voltage dividing element 16 does not have an issue about the overflow energy. For the storage element 18, when the storage element 18 is full of the power and the storage element 18 does not immediately output the power to the cell element 22 (or the power stored in the storage element 18 cannot be used immediately), the storage element 18 may have the issue about the overflow energy. Thus it has to guide and discharge the overflow energy to the environment.

More specifically, the storage element 18 is coupled to the discharge element 20, wherein the storage element 18 has a preset power value. When the lightning's electrical power is higher than the preset power value, the lightning's electrical power exceeding the preset power value is guided and discharged to the environment. In other words, when the storage element 18 is charged by the lightning's electrical power one time or many times to fill up the power of the storage element 18, the storage element 18 may guide and discharge the overflow energy to the environment through the discharge element 20.

The storage element 18 is coupled to the voltage dividing element 16 configured for storing the lightning's electrical power. In practice, the storage element 18, for example, has one or more super capacitors. According to energy density and power density shown in the Ragone Chart, the super capacitor has a larger capacitance, immediately higher charge quantity, and unlimited charge and discharge, so that the super capacitor has the features of rapid charge, high output power, stable discharge, and long lifetime. Thus the storage element 18 can store the higher power of the lightning's electrical power rapidly. The storage element 18 may also be capacitors, inductors, induced coils, batteries, quantum batteries, and etc. The instant embodiment does not limit the types of the storage element 18.

Next, the following description further elaborates the operation of the energy storage device 1 configured for a vehicle 9 and a building 8.

Figure 2:
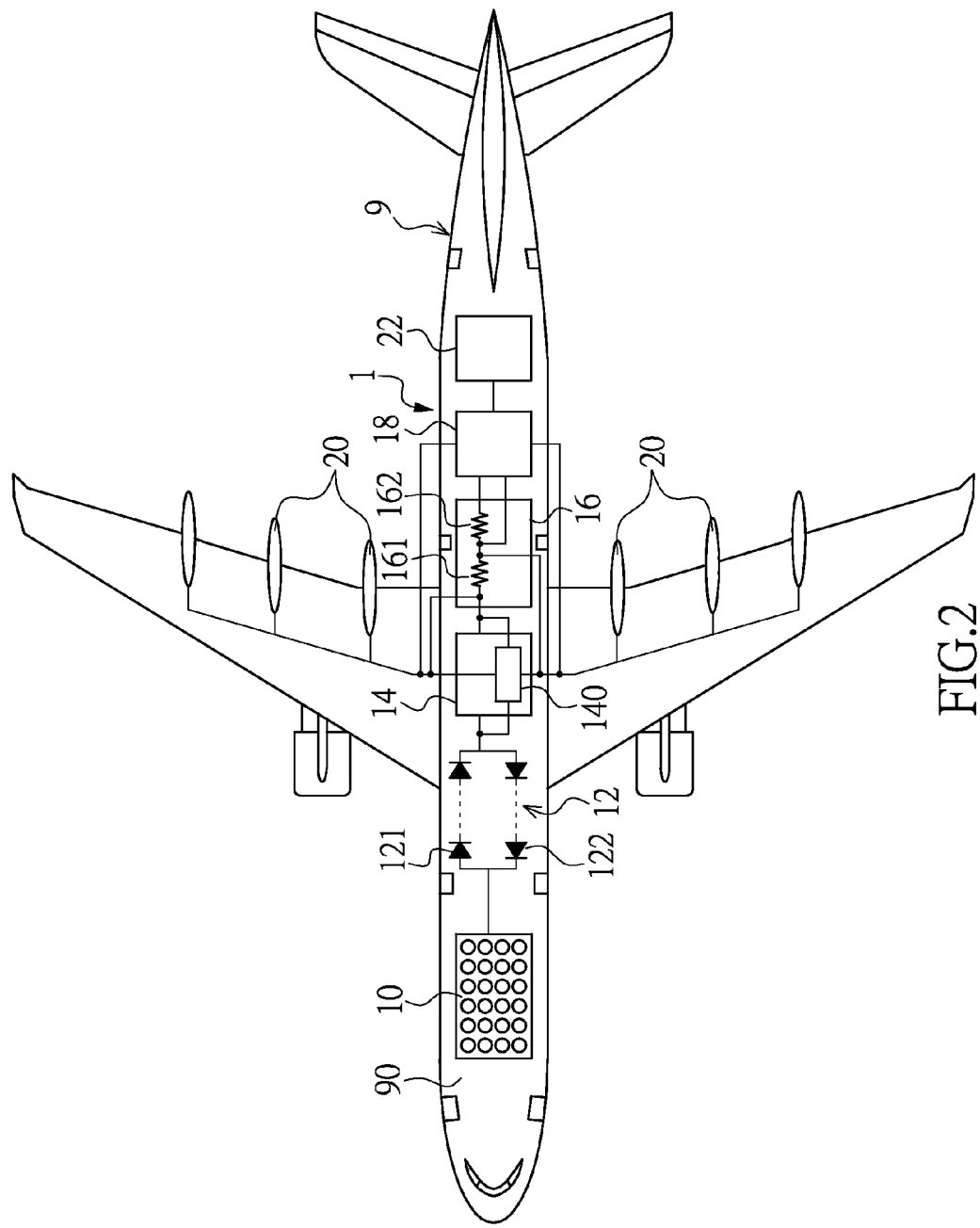
FIG. 2 is a diagram of an energy storage device configured for an airplane according to another exemplary embodiment of the instant disclosure.

FIG. 2 is a diagram of an energy storage device configured for an airplane according to another exemplary embodiment of the instant disclosure. Please refer to FIG. 2, the energy storage device 1 is configured for the vehicle 9. The energy storage device 1 includes a receiving element 10, a conduction element 12, a limiting current element 14, a voltage dividing element 16, a storage element 18, and a cell element 22.

For clarity, the energy storage device 1 of the instant embodiment is configured for an airplane. In other embodiments, the vehicle 9 can be a bus, tour bus, boxcar, train, bullet train, boat, cruise ship, and other vehicles. The instant embodiment does not limit the types of the vehicle 9.

For example, the airplane may suffer from the lightning strike during the flight. The lightning strike can be in-cloud lightning, cloud-to-cloud lightning, or cloud-to-ground lightning. When the airplane flies over the 0° C. air layer (i.e., the air temperature drops to below the freezing point), the liquid water within the cloud becomes ice crystals and supercooled water droplets (i.e., the temperature of the liquid water below its freezing point without it becoming a solid). Because the difference of the air density causes air convection, the electric charges are generated during the frictional collision among the supercooled water droplets or the ice crystals. When there are two opposite potentials separated at a distance and the electric field intensity between the two opposite potentials is large enough, it may initiate discharge between the two opposite potentials to cause lightning. Thus the energy storage device 1 of the instant embodiment can receive lightning's electrical power through the receiving element 10.

For clarity, the receiving element 10 is configured near the nose of the airplane. In other embodiments, the receiving element 10 can be configured for the fuselage or the empennage of the airplane. In addition, the receiving element 10 can be designed by the shape or the wind drag of the airplane, such as a conductive projection or a rounded convex-shaped device for receiving the lightning and the receiving element 10 is projected from a surface of a housing 90 of the airplane,. The receiving element 10 can include a plurality of conductive projections connected with each other to form a set of lightning rods, as shown in FIG. 2. The instant embodiment does not limit the types of the receiving element 10.

Besides, the housing 90 is the metal housing or the composite material housing that forms a Faraday's cage. For example, when the airplane is struck by lightning, the Faraday's cage shelters parts of the large current of the lightning's electrical power and a partial current of the lightning's electrical power can be received from the receiving element of the housing 90. Then the partial current of the lightning's electrical power is transmitted to the limiting current element 14 through the second path 122 of the conduction element 12. Next, the current divider 140 of the limiting current element 14 limits and guides the current of the lightning's electrical power to the voltage dividing element 16. The second one-way conduction element configured in the second path 122 has serial diodes with each other. One end of the second one-way conduction element is coupled to the receiving device of the housing 90 and the other end of is coupled to the limiting current element 14. More specifically, in the second one-way conduction element, the cathode of first diode counted from left to right is coupled to the receiving element 10 of the housing 90 and the anode of the last diode counted from left to right is coupled to the limiting current element 14. The instant embodiment does not limit the implementation method of the conduction element, limiting current element 14, and current divider 140.

Next, the voltage dividing element 16 further includes a voltage divider 160. The voltage divider 160 includes a first divider resistance 161 and a second divider resistance 162 connected with the first divider resistance 161 in series. A ground end of the voltage dividing element 16 is coupled to the discharge element 20. The voltage dividing element 16 is coupled to the storage element 18. Thus the voltage dividing element 16 divides the high voltage of the lightning's electrical power and provides a voltage suitable for the storage element 18 to the storage element 18.

Specifically, the first divider resistance 161, for example, can be an adjustable resistor or the composition of the voltage division resistors. The first divider resistance 161 is coupled between the limiting current element 14 and the second divider resistance 162. Thus the high voltage of the lightning's electrical power is transmitted to the discharge element 20 through the first divider resistance 161, so as to discharge to the environment. Because, the second divider resistance 162 is connected with the first divider resistance 161 in series, the high voltage of the lightning's electrical power is divided by the first divider resistance 161 and the second divider resistance 162 to generate a suitable divided voltage to the storage element 18. For clarity, the voltage dividing element 16 can protect the storage element 18 and provide the divided voltage suitable for the storage element 18 to charge the storage element 18.

Next, the cell element 22 is coupled to the storage element 18. The cell element 22 is configured for outputting the power to the electrical equipment of the vehicle 9. In practice, the cell element 22, for example, is a zinc-silver accumulator, a cadmium-nickel accumulator, or other types of an accumulator for the airplane, and the instant disclosure is not limited thereto. The cell element 22 is a standby power configured in the airplane to provide electricity for many kinds of the electrical equipment in the airplane, such as the red and blue indicator light configured at two wings, the air conditioning system configured in the cabin, or the recreation apparatus configured near the seat.

It is worth to note that the energy storage device 1 can be designed for the types of the in-cloud lightning, the cloud-to-cloud lightning, or cloud-to-ground lightning. For example, the discharge rod of the airplane is 300 kV electrostatic discharge or 500Ω resistance. The preset current value of the limiting current element 14 can be designed for the discharge capability of the discharge rods and the electric quantity generated from the in-cloud lightning, the cloud-to-cloud lightning, or cloud-to-ground lightning. Similarly, the receiving element 10, the voltage dividing element 16, storage element 18, and the discharge element 20 can also be designed for the discharge capability of the discharge rods and the electric quantity generated from the in-cloud lightning, the cloud-to-cloud lightning, or cloud-to-ground lightning. The instant embodiment does not limit the types of the energy storage device 1.

Figure 3:
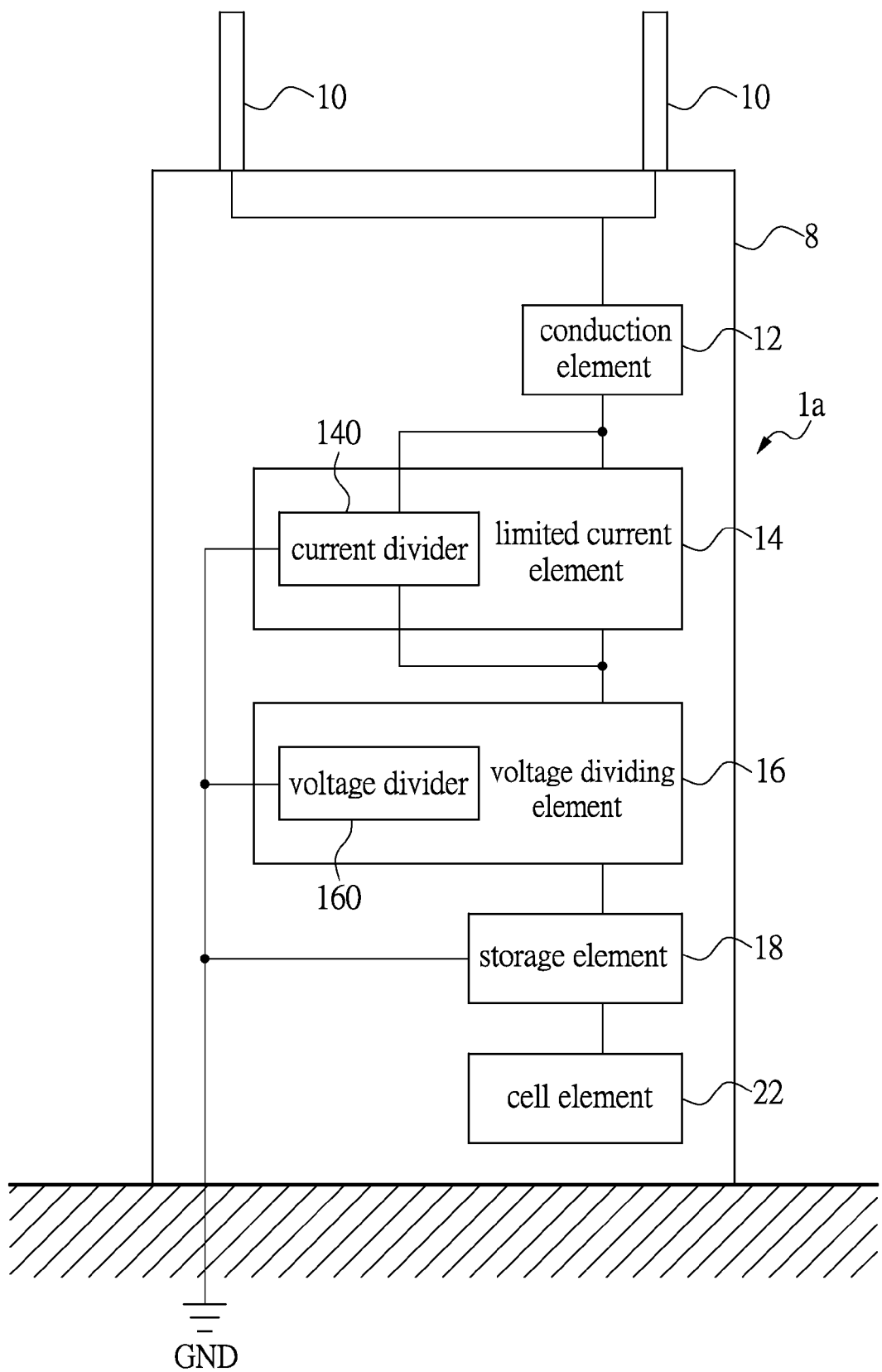
FIG. 3 is a diagram of an energy storage device configured for a building according to another exemplary embodiment of the instant disclosure.

FIG. 3 is a diagram of an energy storage device configured for a building according to another exemplary embodiment of the instant disclosure. The related structures and connections associated with the energy storage device 1a are essentially similar to that associated with the energy storage device 1. For example, the energy storage device 1a limits the current of the lightning's electrical power through the limiting current element 14 and then provides a voltage suitable for the storage element 18. However, there is a difference between the energy storage device 1 and 1a, i.e., the receiving element 10 of the energy storage device 1a is an active lightning rod or a passive lightning rod configured at the top of the building 8. The receiving element 10 is projected from the building 8 or is higher than the building 8, as shown in FIG. 3.

It is worth to note that the building 8 is configured on the earth surface. Due the weather conditions near the building 8, the top of the building 8 may suffer from the lightning strike. The lightning strike results from the cloud-to-ground lightning. The cloud-to-ground lightning is electrons moving from the cloud to the ground (or the building 8) by a stepped process. A typical length of each step is around 50 meters. The time interval between two adjacent steps is around 50 microseconds (μs). During the discharging process, when the electrons move down to the next step, the negative charges of the cloud are moved down to a step. This is called stepped leader. The average speed of the moving charge in lightning is $1.5 \times 10^5$ m/s. The electric charge released by a lightning flash is around 5 coulombs that are transmitted to the ground.

The receiving element 10, limiting current element 14, voltage dividing element 16, storage element 18, and discharge element 20 of the energy storage device 1a can be designed for the cloud-to-ground lightning. For example, the ground impedance of the building 8 is around 10 Ω. The preset current value of the limiting current element 14 can be designed for the ground impedance of the building 8 and the electric quantity about 5 coulombs. Similarly, the receiving element 10, the voltage dividing element 16, storage element 18, and the discharge element 20 can also be designed for the ground impedance of the building 8 and the electric quantity about 5 coulombs. The instant embodiment does not limit the types of the energy storage device 1a.

Besides, the discharge element 20, for example, can be a ground copper bar, a ground copper line, or a ground copper conductor to connect earth. The cell element 22, for example, can be a lithium battery, nickel-cadmium battery, nickel-metal hydride battery, lead-acid battery, or other secondary batteries to store the lightning's electrical power and provide the power to the electrical equipment of the building 8. Except for the aforementioned differences, those skilled in the art will be able to infer the implementation of the energy storage device 1a based on the aforementioned disclosures and the differences, and further descriptions are hereby omitted.

In summary, exemplary embodiments of the instant disclosure provide an energy storage device for receiving and storing lightning's electrical power. The current of the lightning's electrical power is limited by the limiting current element to generate the limited current of the lightning's electrical power to the voltage dividing element. The voltage of the lightning's electrical power is divided by the voltage dividing element to generate a voltage suitable for the storage element to charge the storage element. Accordingly, the energy storage device can achieve environmental protection and provide power to the electrical equipment of a vehicle or building. Besides, the limiting current element has a preset current value and the voltage dividing element has a preset voltage value. Thus the energy storage device receives the lightning's electrical power to store electric charge of a preset power value (the product of the preset current value and the preset voltage value). The electric charge is stored to the storage element, such as capacitors, super capacitors, inductors, induced coils, batteries, quantum batteries, and etc.

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. An energy storage device, configured for a vehicle, a vessel or an aircraft, the energy storage device comprising:
   a receiving element, configured for receiving a lightning's electrical power in an environment;
   a conduction element, coupled to the receiving element and configured for conducting a first path or a second path in accordance with an electrical property of the lightning's electrical power;
   a limiting current element, coupled to the conduction element and configured for limiting a current of the lightning's electrical power;
   a voltage dividing element, directly coupled to the limiting current element and configured for dividing a voltage of the lightning's electrical power; and
   a storage element, coupled to the voltage dividing element and configured for storing the lightning's electrical power, wherein the storage element comprises one or more super capacitors;
   wherein a first one-way conduction element is configured in the first path, a second one-way conduction element is configured in the second path, one end of the first one-way conduction element is electrically connected to one end of the second one-way conduction element, and the first one-way conduction element and the second one-way conduction element are configured reversely;
   wherein the limiting current element provides the limited current of the lightning's electrical power to the voltage dividing element, and the limiting current element has a preset current value;
   wherein when the current of the lightning's electrical power is higher than the preset current value, a current of the lightning's electrical power exceeding the preset current value is guided and discharged to the environment;
   wherein the voltage dividing element has one or more voltage dividers, each of the voltage dividers provides a voltage suitable for the storage element to the storage element, and the voltage dividing element has a preset voltage value;
   wherein when the voltage of the lightning's electrical power is higher than the preset voltage value, a voltage of the lightning's electrical power exceeding the preset voltage value is guided and discharged to the environment.

2. The energy storage device according to claim 1, wherein a positively charged current of the lightning's electrical power flows through the first one-way conduction element, or a negatively charged electron of the lightning's electrical power current flows through the second one-way conduction element.

3. The energy storage device according to claim 1, wherein the vehicle, the vessel or the aircraft forms a Faraday's cage, wherein the Faraday's cage shelters parts of the large current of the lightning's electrical power and a partial current of the lightning's electrical power can be received from the receiving element.

4. The energy storage device according to claim 3, wherein the conduction element determines whether the lightning's electrical power is positively or negatively charged, the first one-way conduction element comprises one or more serial diodes, and the second one-way conduction element comprises one or more serial diodes.

5. The energy storage device according to claim 1, wherein the limiting current element comprises a current divider;
   wherein when the current of the lightning's electrical power is higher than the preset current value, the current divider guides a current of the lightning's electrical power exceeding the preset current value to a discharge element.

6. The energy storage device according to claim 1, wherein the voltage dividing element comprises one or more voltage dividers, each of the voltage dividers has a ground end and couples to the storage element configured for storing the lightning's electrical power.

7. The energy storage device according to claim 5, wherein the discharge element is a ground element or a discharger, the receiving element is one or more conductive projections configured in a housing of the vehicle, the vessel or the aircraft, and each of the conductive projections is a lightning rod.

8. The energy storage device according to claim 6, wherein the discharge element is a ground element or a discharger, the receiving element is one or more conductive projections configured in a housing of the vehicle, the vessel or the aircraft, and each of the conductive projections is a lightning rod.

9. The energy storage device according to claim 1, further comprising:
   a cell element, coupled to the storage element and configured for outputting a power to an electrical equipment of the vehicle, the vessel or the aircraft.

* * * * *